United States Patent
Hwang

[11] Patent Number: 5,923,714
[45] Date of Patent: Jul. 13, 1999

[54] NORMALIZATION CIRCUIT FOR PREVENTING DIVERGENCE OF A NORMALIZING VOLTAGE IN A COUPLER USED FOR DIVERSITY OPERATION

[75] Inventor: In-Kyou Hwang, Seongnam, Rep. of Korea

[73] Assignee: SamSung Electronics Co., Ltd., Suwon, Rep. of Korea

[21] Appl. No.: 08/826,172

[22] Filed: Mar. 27, 1997

[30] Foreign Application Priority Data

Mar. 27, 1996 [KR] Rep. of Korea ............... 96-8632

[51] Int. Cl.⁶ .................. H04B 7/10; H04B 1/10; H04B 7/02; H04L 1/02
[52] U.S. Cl. ............... 375/347; 375/347; 375/349; 375/267; 455/303; 455/304; 455/305; 455/306; 455/296; 455/272; 455/273; 455/276.1
[58] Field of Search ................... 375/347, 349, 375/267; 455/303, 304, 305, 306, 296, 272, 273, 276.1

[56] References Cited

U.S. PATENT DOCUMENTS

| | | | |
|---|---|---|---|
| 4,270,207 | 5/1981 | Gutleber | 375/267 |
| 4,384,358 | 5/1983 | Shiki et al. | 375/347 |
| 4,731,801 | 3/1988 | Henriksson | 375/347 |
| 4,736,455 | 4/1988 | Matsue et al. | 455/138 |
| 5,109,392 | 4/1992 | McDonald | 375/331 |
| 5,203,023 | 4/1993 | Saito et al. | 455/133 |
| 5,297,168 | 3/1994 | Sant'Agostino et al. | 375/347 |
| 5,321,850 | 6/1994 | Bäckström et al. | 455/139 |
| 5,426,668 | 6/1995 | Lechleider | 375/267 |
| 5,465,271 | 11/1995 | Hladik et al. | 375/267 |
| 5,530,925 | 6/1996 | Garner | 455/273 |
| 5,539,781 | 7/1996 | Matsuura | 375/347 |
| 5,697,083 | 12/1997 | Sano | 455/276.1 |
| 5,754,950 | 5/1998 | Petersson et al. | 455/273 |
| 5,761,252 | 6/1998 | Iinuma | 375/347 |

Primary Examiner—Stephen Chin
Assistant Examiner—Michael W. Maddox
Attorney, Agent, or Firm—Robert E. Bushnell, Esq.

[57] ABSTRACT

A normalization circuit for preventing divergence of the normalizing voltage of a coupler used for diversity operation in a communication system includes: a phase detector for generating a phase detection signal corresponding to first and second phase differences of the signals received from first and second inputs; a normalizer including a reference voltage generator for normalizing the phase detection signal so as to alternatively output one of either a constant voltage value, or a reference voltage value in the event that the constant voltage value is less than the reference voltage value; a phase shifter for multiplying and adding output of the normalizer by and with the first and second phase differences; and an adder for adding the output of the phase shifter to the signals received from the second input.

4 Claims, 2 Drawing Sheets

NORMALIZATION CIRCUIT FOR PREVENTING DIVERGENCE OF A NORMALIZING VOLTAGE IN A COUPLER USED FOR DIVERSITY OPERATION

CLAIM OF PRIORITY

This application makes claims all benefits accruing under 35 U.S.C. §119 from an application for NORMALIZATION CIRCUIT FOR PREVENTING DIVERGENCE OF A NORMALIZING VOLTAGE IN A COUPLER USED FOR DIVERSITY OPERATION earlier filed in the Korean Industrial Property Office on Mar. 27, 1996 and there duly assigned Ser. No. 8632/1996.

BACKGROUND OF THE INVENTION

1. Field of the Invention

The present invention relates to a communication system, and more particularly a coupler for preventing divergence of a phase detection voltage normalized for diversity operation.

2. Description of the Related Art

Generally in shortwave radio communications, the electric field strength of a receiving point is irregular with time due to the fading effect which results in unstable communication. In order to prevent such phenomenon, a diversity system is employed, in which the outputs of two or more antennas in different locations are combined into a single received signal for obtaining a stable output. Accordingly, a signal coupler is needed to combine signals received by two or more antennas in the diversity operation mode.

In an earlier coupler, first and second signals from first and second antennas are input to the coupler.

A phase shifter splits the first input signal into signals having a phase of 0° and phase of 90°. A first multiplier multiplies the 0° phase signal by the second input signal while a second multiplier multiplies the 90° phase signal by the second input signal. The outputs of the first and second multipliers are respectively fed to first and second low pass filters whose output is fed to a normalization circuit.

One output of the normalization circuit is multiplied by the 0° phase signal in another multiplier while a second output of the normalization circuit is multiplied by the 90° phase signal in still another multiplier. The outputs of these two multipliers are added in an adder and the output of the adder is added to the second input signal in another adder whose output forms the combined value of two signals of the same intensity after adjusting the two signals so as to be equiphase.

The normalization circuit includes two squaring circuits whose outputs are summed together in an adder. The output of the adder is fed to a square root circuit whose output is fed to a pair of dividers whose other inputs are respectively fed to the two inputs to the normalization circuit.

Normally, the output of the square root circuit is a constant value. However, if the two inputs fed to the normalization circuit are very low, the normalized signal output from the square root circuit becomes very low, thereby resulting in a divergences of the phase detection signals having a constant vector sum and output from the normalization circuit. Consequently, the phase shifing performance is effected by the divergence of the phase detection signals, thereby causing a voltage fluctuation phenomenon.

The following patents are but a sample of diversity systems having features in common with the present invention but nevertheless failing to teach or suggest a coupler including elements for preventing divergence of the phase detection voltage normalized for diversity operation.

U.S. Pat. No. 5,539,781 to Matsuura, entitled Combining Diversity Apparatus With Squelch Function, U.S. Pat. No. 5,465,271 to Hladik et al., entitled Post Detection Weighted Vector Combining Diversity Receivers Using Phase Metrics For Mobile And Indoor Radio Channels, U.S. Pat. No. 5,426,668 to Lechleider, entitled Tetherless Access To Communication Networks, U.S. Pat. No. 5,297,168 to Sant'Agostino et al., entitled Space-Diversity Digital Mobile Receiver And Relevant Process, U.S. Pat. No. 5,321, 850 to Bäckström, et al., entitled Diversity Radio Receiver Automatic Frequency Control, U.S. Pat. No. 4,731,801 to Henriksson, entitled Method For The Reception And Detection Of Digital Signals, and U.S. Pat. No. 4,270,207 to Gutleber, entitled Combined ECCM/Diversity Tropospheric Transmission System.

SUMMARY OF TIHE INVENTION

It is an object of the present invention to provide a novel normalization circuit for preventing the divergence of the normalizing voltage by means of a coupler for diversity operation which prevents the voltage drop below the predetermined reference voltage when the normalizing signal of the phase detector approaches to zero(0).

According to the present invention, a normalization circuit for preventing divergence of the normalizing voltage of a coupler used for diversity operation in a communication system, comprises a phase detector for generating a phase detection signal corresponding to first and second phase difference of the signals received from first and second inputs, a normalizer including a reference voltage generator for normalizing the phase detection signal so as to alternatively output one of either a constant voltage value or a reference voltage value in the event that the constant voltage value is less than the reference voltage value, a phase shifter for multiplying and adding the output of the normalizer by and with the first and second phase differences, and an adder for adding the output of the phase shifter to the signal received from the second input.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT(S)

Figure 1:
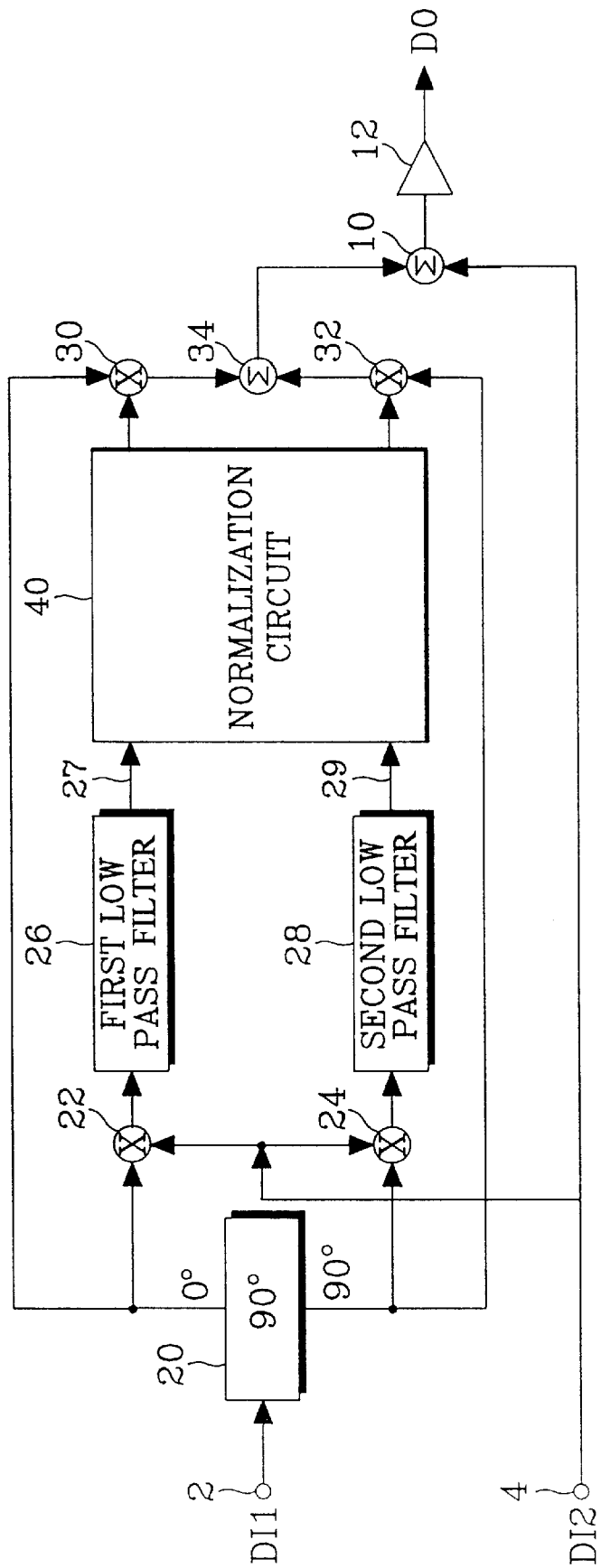
FIG. 1 is a block diagram illustrating an earlier coupler for diversity operation.
Figure 2:
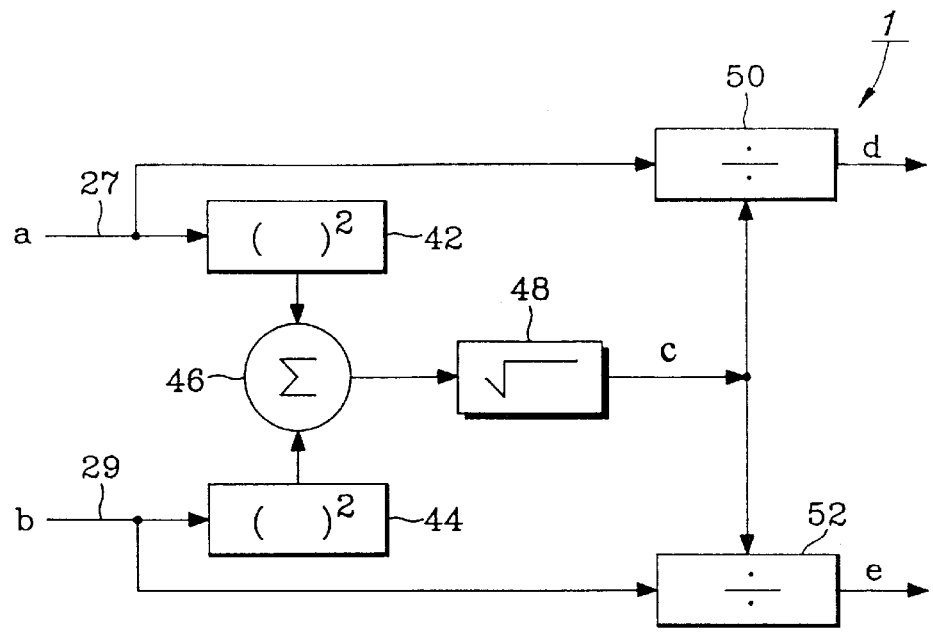
FIG. 2 is a block diagram illustrating a nonnalizing circuit of an earlier coupler for diversity operation.

FIG. 1 illustrates a coupler for diversity operation mode of a digital microwave system. The coupler comprises a phase shifter and a phase detector, whereby two signals of different phases are adjusted to an equiphase or a phase satisfying specific conditions so as to combine two signals of the same intensity. FIG. 2 illustrates a block diagram of an embodiment of the normalization circuit shown in FIG. 1.

The embodiments of FIGS. 1 and 2 are described in detail in Korean Patent Application No. 95-25168, filed on Aug. 16, 1995 by the same applicant as that of the present application.

Referring to FIG. 1, the phase shifter consists of phase distributor 20, multipliers 30 and 32, and adder 34. The phase detector consists of phase distributor 20, multipliers 22 and 24, and 1st and 2nd low pass filters 26 and 28. The normalization circuit 40 normalizes the output of the phase is detector and delivers the results to the multipliers 30 and 32.

Reference numerals 2 and 4 each represent respective input terminals which receive the corresponding intermediate-frequency signals converted from input signals received through two antennas. The intermediate-frequency signal DI1 received through 1st input terminal 2 is split into signals having phase 0° and 90° by the phase splitter 20, the split signals being supplied to respective multipliers 22 and 24. The intermediate frequency signal DI2 received through 2nd input terminal 4 is directly supplied to multipliers 22 and 24.

The output of multiplier 22 is filtered through the 1st low pass filter 26 and delivered to line 27 as direct current phase difference information represented by a sine function (sin φ). The output of multiplier 24 is filtered through the 2nd low pass filter 28 and delivered to line 29 as direct current phase difference information represented by a cosine function (cos φ).

The normalization circuit 40 is connected to the output terminals of the 1st and 2nd low pass filters 26 and 28, thereby keeping the magnitude of the vector sum of the phase detection signals supplied to multipliers 30 and 32 constant.

The phase shifter of the coupler employs the normalized signal from the normalization circuit 40. The multiplier 30 multiplies the outputs of the normalization circuit 40 and the outputs having phase 0° of the phase splitter 20, and the multiplier 32 multiplies the outputs of the normalization circuit 40 by the outputs having phase 90° from phase splitter 20. Then, the adder 34 adds the is outputs of the multipliers 30 and 32, and supplies the results to the adder 10. The adder 10 adds the output of adder 34 and the intermediate signal DI2 received through 2nd input terminal 4, thereby transmitting the result as output signal DO via buffer 12. It is desirable for the output signal DO to be a combined value of two signals of the same signal intensity after adjusting two signals to an equiphase.

Referring to in FIG. 2, the normalization circuit 40 comprises squares 42 and 44, a square rooter 48, and dividers 50 and 52. Accordingly, when each of above two phase detection signals a and b are divided by the normalizing signal c which is generated by employing the phase detection signals a and b supplied to the lines 27 and 29 by means of the square rooter 48, the phase detection signals d and e having a constant vector sum are obtained.

The normaling signal c which is the output of the normalization circuit 40 is expressed by the following Equation 1:

$$c = \sqrt{a^2 + b^2} \quad \text{Eq. 1}$$

Since the above phase detection signals a and b are each represented by sin φ and cos φ respectively, the c in above Eq. 1 is a constant value, i.e. a normalized signal.

The outputs of dividers 50 and 52, i.e. the phase detection signals d and e, each having a constant vector sum, are expressed by following Equations 2 and 3 respectively:

$$d = \frac{a}{c} = \frac{a}{\sqrt{a^2 + b^2}} \quad \text{Eq. 2}$$

$$e = \frac{b}{c} = \frac{b}{\sqrt{a^2 + b^2}} \quad \text{Eq. 3}$$

Accordingly, the vector sum delivered from the normalization circuit 40 and supplied to the phase shifter has always a constant value:

$$\sqrt{d^2 + e^2} = \sqrt{\left(\frac{a}{\sqrt{a^2+b^2}}\right)^2 + \left(\frac{b}{\sqrt{a^2+b^2}}\right)^2} = 1$$

However, if the phase detection signals a and b are very weak, i.e. much lower than 1 volt, the normalizing signal c becomes very weak, thereby resulting in divergence of the phase detection signals d and e having a constant vector sum. Consequently, the phase shifting performance is affected by divergence of the phase detection signals d and e. Therefore, if the phase detecting voltage is diverged, a voltage fluctuation phenomenon is caused.

Since the deterioration of the coupler's performance, i.e. the divergence of the phase detection signals produced by vector sum is caused when the normalizing signal is very weak, a comparator is provided to output the predetermined reference voltage according to the present invention.

Figure 3:
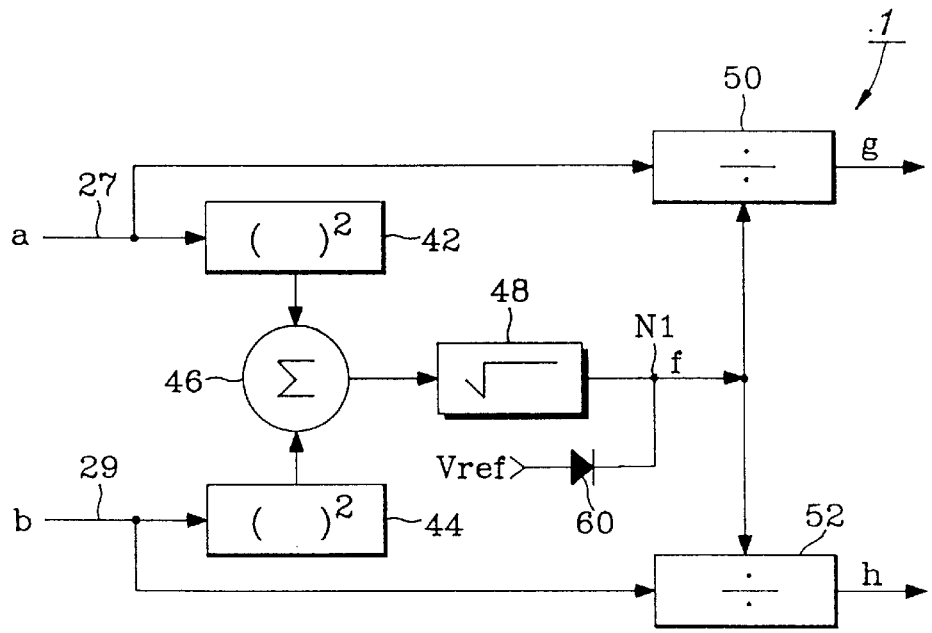
FIG. 3 is a block diagram illustrating a normalization circuit to prevent divergence of the normalizing voltage of a coupler for diversity operation according to the present invention.

According to the present invention, the normalization circuit 40 of the coupler shown in FIG. 1 is replaced with the inventive normalization circuit 40 illustrated in FIG. 3. In other words, except the normalization circuit 40, the remaining constituent elements of the coupler shown in FIGS. 1 and 2 are the same as those employed in the present invention. And except for the comparator consisting of the reference voltage Vref and diode 60, the remaining constituent elements shown in FIG. 3 are the same as the corresponding elements shown in FIG. 2.

Referring to FIG. 3, the normalization circuit 40 of the present invention comprises squares 42 and 44, an adder 46, a square rooter 48, a comparator including the diode 60 and reference voltage Vref, and dividers 50, 52, wherein squares 42 and 44 are respectively connected to the input lines 27 and 29. The outputs of the squares 42 and 44 are supplied to the adder 46, and the output of the adder 46 is supplied to the square rooter 48. The square rooter 48 is connected to node N1. The cathode terminal of the diode 60 is connected to node N1, and node N1 is connected to the input lines of the divisors ofthe dividers 50 and 52. The input terminals of the dividends of the dividers 50 and 52 are respectively connected to the input lines 27 and 29.

In the above normalization circuit 40, the phase detection signals a and b are processed to become constant normalizing signals by means of the squares 42 and 44, the adder 46 and the square rooter 48. When the output signals of the square rooter 48 approach zero, then the diode 60 is turned on, whereby the reference voltage Vref-Vd of a constant value is supplied to the node N1 to be delivered to the dividers 50 and 52, Vd being the lowest turn-on voltage of the diode 60. Accordingly, Vref-Vd is supplied to divisors of the dividers 50 and 52, thereby outputting the phase detection signals g and h having a constant vector sum. Namely, when the reference voltage Vref of 0.7 volts is supplied to the diode 60, if the normalizing signal f supplied to the node N1 is greater than 0.7-Vd, the output signal $$\sqrt{a^2 + b^2} -$$

from the square rooter 48 is applied as divisor value to the dividers 50 and 52, and if the normalizing signal f is smaller than 0.7-Vd, 0.7-Vd is supplied as the divisor value to the dividers 50 and 52.

Hence, the output voltages of the dividers 50 and 52 can be always maintained at a stable voltage without diverging. Consequently, the output of the phase shifter is stable without fluctuating. When the voltage of the normalizing signal f is lower than the specified input voltage, the minimum allowable voltage is supplied to the dividers 50 and 52 by the instrumentality of the turn-on operation of the diode 60 so as to prevent divergence of the phase detection signals g and h, whereby the output signals of the phase shifter can be sttbilized without fluctuating. Accordingly, the performance of the coupler used for diversity can be improved according to the present invention.

It should be understood that the present invention is not limited to the particular embodiment disclosed herein as the best mode contemplated for canying out the present invention, but rather that the present invention is not limited to the specific embodiments described in this specification except as defined in the appended claims.

What is claimed is:

1. A normalization circuit for preventing divergence of the normalizing voltage of a coupler used for diversity operation in a communication system, comprising:

a phase detector for generating a phase detection signal corresponding to first and second phase differences of the signals received from first and second inputs;

a normalizer including a reference voltage generator for normalizing said phase detection signal so as to alternatively output one of either a constant voltage value, or a reference voltage value in the event that said constant voltage value is less than said reference voltage value;

a phase shifter for multiplying and adding the output of said normalizer by and with the first and second phase differences; and an adder for adding the output of said phase shifter to the signal received from said second input.

2. A normalization circuit as defined in claim 1, said normalizer comprising:

a first squarer for squaring said first phase difference;

a second squarer for squaring said second phase difference;

an adder for adding outputs of said first and second squarers;

a square rooter for extracting the square root of an output of said adder;

a comparator for comparing an output of said square rooter with said reference voltage so as to alternatively produce either the output of said square rooter or said reference voltage depending on whether or not the output of said square rooter is greater than said reference voltage;

a first divider for dividing said first phase difference by an output of said comparator; and a second divider for dividing said second phase difference by said output of said comparator.

3. A normalization circuit as defined in claim 1, said reference voltage being set to a value smaller than 1 volt.

4. A normalization circuit for preventing divergence of the normalizing voltage of a coupler used for diversity operation in a communication system, comprising:

a phase splitter for splitting a first intermediate frequency signal to phase of 0° and phase of 90°;

a first multiplier for multiplying said split phase signal of phase 0° by a second intermediate frequency signal;

a second multiplier for multiplying said split phase signal of phase 90° by said second intermediate frequency signal;

a first low pass filter for filtering the output of said first multiplier so as to output a first phase detection signal;

a second low pass filter for filtering the output of said second multiplier so as to output a second phase detection signal;

a first squarer for squaring said first phase detection signal;

a second squarer for squaring said second phase detection signal;

an adder for adding outputs of said first squarer and said second squarer;

a square rooter for extracting a square root of an output of said adder;

a reference voltage generator for generating a reference voltage;

a comparator for comparing an output of said square rooter with said reference voltage so as to alternatively produce either the output of said square rooter or said reference voltage depending on whether or not as the output of said square rooter is greater than said reference voltage;

a first divider for dividing said first phase detection signal by an output of said comparator;

a second divider for dividing said second phase detection signal by the output of said comparator;

a third multiplier for multiplying an output of said first divider by said split 0°-phase signal of said first intermediate frequency signal;

a fourth multiplier for multiplier the output of said second divider by the split 90°-phase signal of said first intermediate frequency signal;

a first adder for adding outputs of said third and said fourth multipliers; and a second adder for adding outputs of said first adder and said second intermediate frequency signal.

* * * * *